United States Patent [19]
Simko

[11] 3,799,679
[45] Mar. 26, 1974

[54] GLASS DISTORTION SCANNING SYSTEM
[75] Inventor: Gabriel Simko, Springdale, Pa.
[73] Assignee: PPG Industries, Inc., Pittsburgh, Pa.
[22] Filed: June 27, 1972
[21] Appl. No.: 266,817

[52] U.S. Cl. .......... 356/200, 250/219 DF, 356/237
[51] Int. Cl. .......................................... G01n 21/32
[58] Field of Search...... 250/219 DF; 356/161, 199, 356/200, 237, 239, 240

[56] References Cited
UNITED STATES PATENTS
3,307,446  3/1967  Rottmann .......................... 356/161
3,445,672  5/1969  Marks ............................ 356/237 X

FOREIGN PATENTS OR APPLICATIONS
1,207,976  10/1970  Great Britain ..................... 356/161

Primary Examiner—Ronald L. Wibert
Assistant Examiner—F. L. Evans
Attorney, Agent, or Firm—Thomas F. Shanahan; Donald Carl Lepiane

[57] ABSTRACT

Disclosed are a method and apparatus for detecting distortion in glass, particularly glass ribbons, by scanning the glass with a light beam and photoelectrically measuring the rate of change of the widthwise, center-to-center spacing between a reflected image of said beam from one surface of the glass and a reflected image of said beam from the opposite surface of the glass. The center-to-center spacing of the reflected beams varies as the distortion in the glass varies, and the rate of change of the spacing is a measure of the refractive power or distortion in the glass.

20 Claims, 2 Drawing Figures

GLASS DISTORTION SCANNING SYSTEM

BACKGROUND OF THE INVENTION

In methods of making glass by the known float process, plate process or sheet process, defects may be produced in the glass which render the glass optically imperfect. Among the optical imperfections that may be produced in these processes is distortion. Distortion, as the term is used herein, is generally intended to include both variations in the thickness of a glass ribbon and variations in its composition. Variations in the thickness of the glass ribbon may be exemplified by portions thereof having opposite surfaces that are either flat and non-parallel, non-flat and non-parallel or non-flat and parallel. On the other hand, variations in the composition of the glass ribbon may be exemplified by the Type B defects disclosed in U.S. Pat. No. 3,199,401, assigned to the assignee of the present invention. These Type B defects are known as strings, striae and ream.

In the instance of both of the above-mentioned defects, i.e., thickness defects and compositional defects, it has been noted that the occurrence of these defects or variations across the width of the ribbon is at least an order of magnitude greater than that along the length of the ribbon or draw. Accordingly, it is desirable when inspecting glass for these defects to scan the width of the ribbon as well as the length of the ribbon. Prior to the present invention, no automatic inspection system was known which inspected both the length and width of a glass ribbon for distortion defects due to both thickness and compositional variations in the glass, while continuously producing the glass ribbon by one of the known glass-making processes.

SUMMARY OF THE INVENTION

According to the present invention, there is provided a method and apparatus for detecting distortion in glass, particularly continuous glass ribbons during the process of their manufacture, by scanning the glass with a light beam and photoelectrically measuring the rate of change of the widthwise, center-to-center spacing between a reflected image of said beam from one surface of the glass and a reflected image of said beam from the opposite surface of the glass. The center-to-center spacing of said reflected beams varies as the distortion in the glass varies, and the rate of change of the spacing is a measure of the refractive power or distortion in the glass.

DETAILED DESCRIPTION OF THE INVENTION

Figure 1:
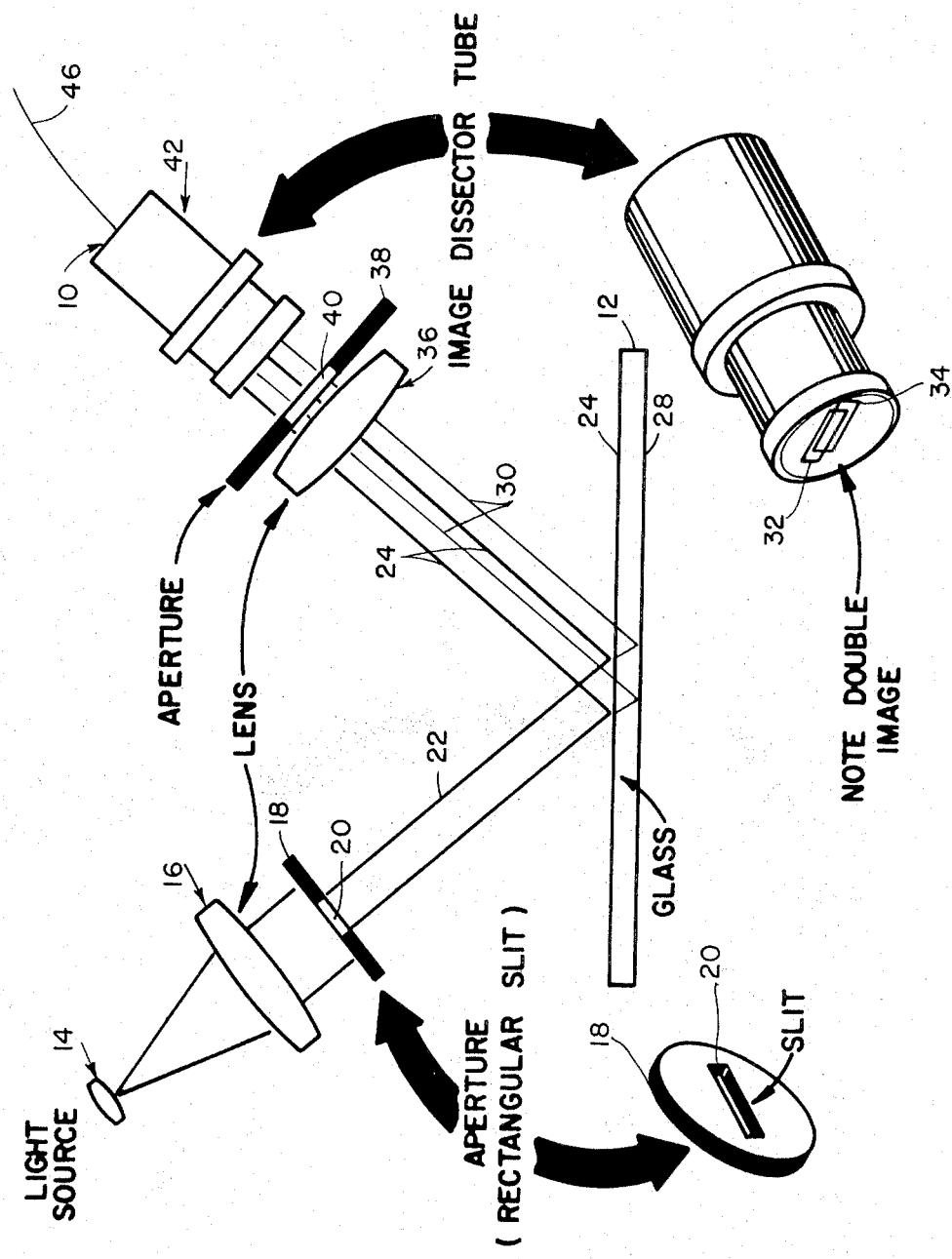
FIG. 1 is a schematic illustration of a preferred embodiment of the present invention with a glass ribbon approaching the viewer in a widthwise manner and with distortion scanning apparatus of the invention being disposed above or to one side of the glass ribbon.

With reference to FIG. 1 there is shown a distortion scanning apparatus 10 scanning a glass ribbon 12 for optical distortion. The scanning apparatus 10 includes a light source 14, a lens 16 and a plate 18 having an aperture 20, e.g., a rectangular slit for transmitting a beam of light 22 of finite width, e.g., a rectangular image or beam of light toward the glass ribbon 12 at an oblique angle of incidence, e.g., 18°. The light source 14 is preferably a relatively high intensity light source, such as a tungsten-halogen, filament lamp. However, the light source may, for example, be a laser beam. The rectangular slit aperture 20 may, for example, have dimensions of about 0.1 inch by 1.5 inches, although such dimensions are not deemed critical.

The lens 16 shown is representative of one or more lenses employed to focus and further increase the intensity of the beam of light 22 transmitted from the light source to the rectangular slit aperture and/or to collimate said light. It will be understood, of course, that if a laser beam were employed as the light source the use of a lens to increase its intensity and/or collimate such light would generally not be necessary. On the other hand, when using laser light a cylindrical lens might be employed, in lieu of, for example, a rectangular slit aperture, in order to transmit an image of light having two substantially parallel sides, such as the long sides of an image produced by a rectangular slit.

A portion of the light energy of the rectangular beam of light 22 transmitted from the light source 14 to the glass 12 is reflected at an oblique angle from the glass at a first surface 24 it intercepts as reflected beam of light 26, e.g., as a reflected rectangular beam or image of light. A further portion of the light energy is refracted through the glass body to the second or opposite surface 28 of the glass and is then reflected back to the first surface 24 where it emerges as a refracted beam of light 30, e.g., as a refracted rectangular beam or image of light. The refracted beam of light 30 is transmitted from the surface 24 at an oblique angle along a path substantially parallel to, or at a small angle to, the path of the reflected beam of light 26 from the first surface 24 of the glass.

Accordingly, the images of light produced on the two opposite surfaces 24 and 28 of the glass by the beam of light 22 are transmitted as reflected beam 26 and refracted beam 30, respectively along oblique paths from the glass, in spaced relation to each other. In the embodiment shown, where the angle of incidence of, for example, 18 degrees is used, reflected images of light 32 and 34 of the reflected beam 26 and the refracted beam 30, respectively, are in spaced, partially overlapping relation to each other. This overlapping relation is not essential, but is preferred.

With continued reference to FIG. 1, there is shown, in the path of the reflected beam 26 and refracted beam 30 a lens, 36 an adjustable iris diaphragm member 36 and an image dissector tube 42 or scanning photomultiplier tube. The lens 36 is intended to represent one or more lenses that may, if necessary, be employed to focus and increase the intensity of the reflected and refracted images of light 32 and 34, respectively. The adjustable iris diaphragm member 38, which is disposed between the lens 30 and, for example, a scanning photomultiplier tube 42, may be used to adjust or control the intensity of the light being gathered.

Disposed beyond the diaphragm member 30 in the path of the reflected beam 26 and refracted beam 30 is, preferably, the scanning photomultiplier tube 42. A particular preferred scanning photomultiplier tube may a Type FW 129 multiplier phototube, manufactured by ITT (International Telephone and Telegraph Corporation), Electron Tube Division, Fort Wayne, Indiana. The Type FW 129 tube is a 16-stage multiplier phototube of the end-window type having an S—11 spectral response. An electron lens system with a defining aperture in the electron image plane is incorporated in this tube between the photocathode and the first dynode. This feature improves the equivalent noise input by reducing collected thermionic emission current and ion feedback, at the same time maintains high collection efficiency in the effective photocathode area. By means of an external magnetic field, the electron image in the plane of the aperture may be deflected in a systematic pattern, thus yielding information suitable for tracking or scanning systems. In a preferred embodiment of the present invention, each scan of the width of the combined reflected and refracted images of light 32 and 34, respectively is accomplished in about 30 microseconds, yielding a measurement of their combined width.

Figure 2:
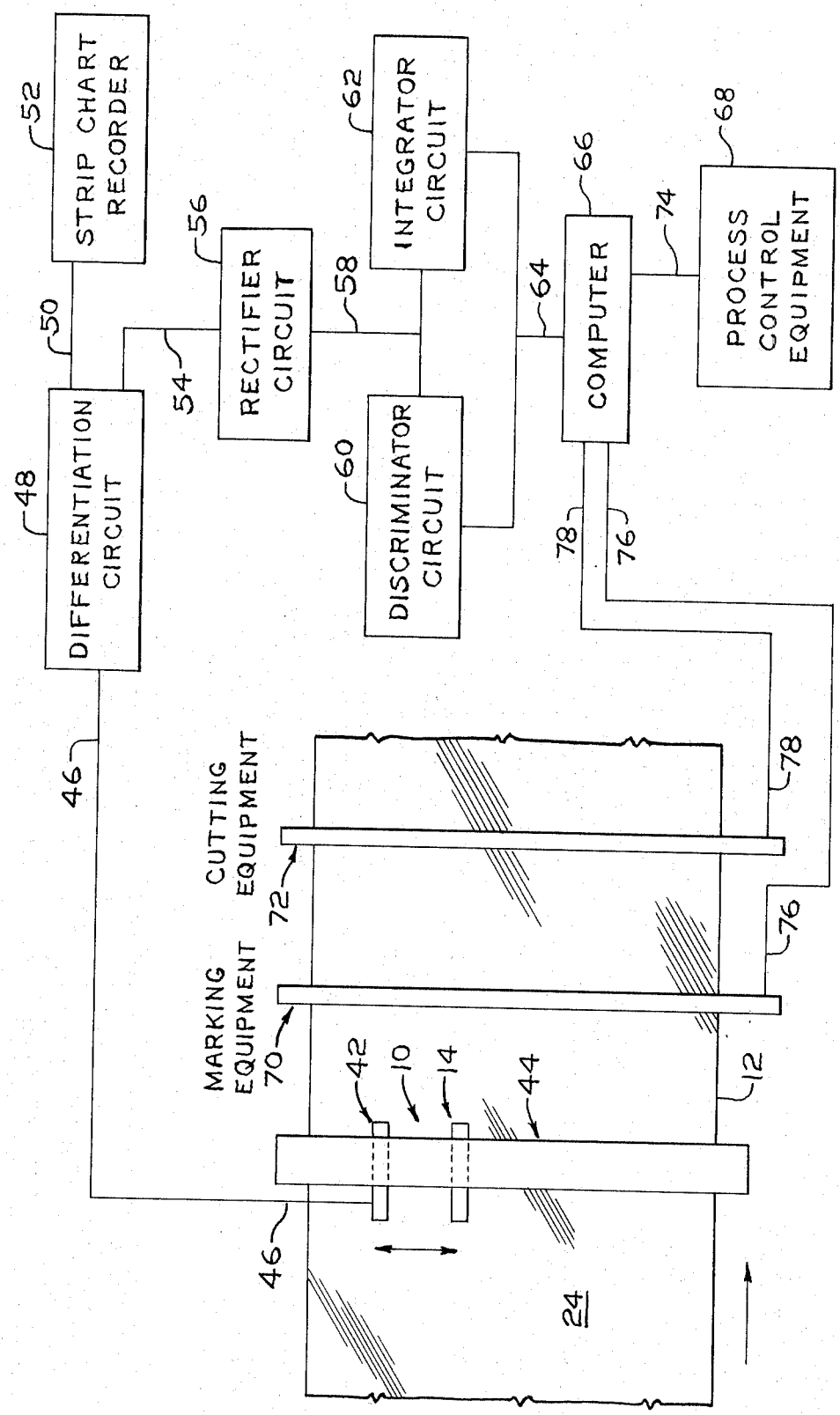
FIG. 2 is a plan view of the distortion scanning apparatus scanning a moving glass ribbon according to the practice of this invention and operating on associated facilities to further process the glass ribbon according to the practice of the invention.

With reference to FIG. 2 and in accordance with the present invention, the glass ribbon 12 moves from left to right as viewed in FIG. 2 while the scanning apparatus 10, advantageously supported on a scanning bridge 44 for reciprocal movement along a path traverse to the movement of the glass ribbon 12, scans the glass ribbon to measure distortion in the glass ribbon, i.e., the refractive power of the glass ribbon. A suitable scanning bridge for supporting the scanning apparatus 10 of this invention is disclosed in U.S. Pat. No. 3,199,401, assigned to the assignee of this invention. Moreover, it is preferable, although not considered to be absolutely necessary, that all of the scanning apparatus components shown in FIG. 1 be mounted in a common support for movement to and fro across the scanning bridge. Typically, for a ribbon of glass 170 inches wide moving at a rate of about 200 inches per minute, a suitable scan time would be about 30 seconds in each direction across the width of the ribbon, yielding a widthwise, center-to-center point scan along the length of the ribbon about every 100 inches. While a single scanning apparatus may be used, obviously more glass will be inspected if a plurality of such scanning apparatus are used, either mounted on one bridge or a plurality of bridges.

With continued reference to FIG. 2 and in following the practice of this invention, the output signal of the scanning photomultiplier tube 42 forwarded by way of cable 46 to a differentiation circuit 48 for measuring the rate of change of the widthwise, center-to-center spacing between the reflected image 32 of the transmitted beam of light 26 and the refracted image 34 of the refracted beam of light 30 reflected from surfaces 24 and 28, respectively of the glass. Obviously, detected and differentiated changes in the combined width of the overlapping images yields the same result. As mentioned heretofore, the rate of change of this spacing is a measure of the refractive power or distortion in the glass.

Further refinement or utility of the distortion or rate of change signal produced in accordance with this invention may be had by:

a. feeding the signal from the differentiation circuit 48 by way of cable 50 to a strip-chart recorder 52; or b. feeding the signal from the differentiation circuit 48 by way of cable 54 to rectifier circuit 56 for determining the absolute value of said rate of change of said spacing of said images; and, if desired:

c. feeding the signal from said rectifier circuit 56 by way of cable 58 to either or both a discriminator circuit 60 and an integrator circuit 62 for determining, respectively, the peak value or zonal peak values and the sum value or zonal sum values of the rate of change of said spacing of said images across the width of the glass; and, then, if desired:

d. feeding either or both peak values and sum values or peak zonal values and sum zonal values by way of cable 64 to a computer 66, which may be a digital or an analog computer or other suitable circuitry, including logic circuitry of all kinds.

Moreover, by connecting process control, equipment 68 marking, equipment 70 cutting equipment or other processing equipment by way of cable 74, 76 or 78, respectively, to a signal from the computer 66, which signal is in response to the rate of change of the spacing of the images, for changing process parameters, for marking distortion defects in the glass, for optimizing cutting of the glass ribbon and/or for other process equipment adjustments, there may be realized a most effective utilization of the scanning system of this invention. Such techniques of process control, marking and/or cutting and the like of glass, pursuant to a defect signal from a computer, are fully disclosed in applicant's assignee's U.S. Pat. Nos. 3,166,627, 3,191,857, 3,199,401, 3,202,043, 3,246,550, 3,609,380, 3,644,934 and 3,656,854, the disclosure of each of which is incorporated herein by reference.

Obviously, further refinements or changes in the techniques and apparatus disclosed herein will occur to those skilled in the art. For example, in lieu of use of a scanning photomultiplier tube, there may be employed an oscillating mirror and other photoelectric detector device or devices, such that the oscillating mirror receives the reflected images from the glass and the photoelectric detector device or devices are positioned in the field of view of the oscillated images to detect changes in their widthwise, center-to-center spacing.

I claim:

1. Apparatus for measuring refractive power of glass, comprising:

means for transmitting a beam of light of finite width at an oblique angle onto a first surface of two opposite surfaces of the glass, the beam of light being refracted through the first surface to the second surface to reflect a reflected image from the first surface and a refracted image from the second surface;

means for measuring the rate of change of the widthwise, center to center spacing between the reflected image and the refracted image reflected from the glass, said measuring means including a photosensitive element means positioned in the path of the reflected image and the refracted image produced by the beam and a differentiation circuit connected to the output from said photosensitive element; and means for transporting said light transmitting means and said photosensitive element means along a scan path across the width of the glass.

2. Apparatus according to claim 1 wherein said photosensitive element means comprises a scanning photomultiplier.

3. Apparatus according to claim 1 wherein the path of the reflected image is at a small angle to the path of the refracted image.

4. Apparatus according to claim 2 wherein the reflected image partially overlaps the refracted image in the field of view of said scanning photomultiplier.

5. Apparatus according to claim 1 which further includes a strip-chart recorder connected to an output signal from said differentiation circuit for recording said rate of change of said spacing of said images.

6. Apparatus according to claim 1 which further includes a rectifier circuit connected to an output signal from said differentiation circuit for determining the absolute value of said rate of change of said spacing of said images.

7. Apparatus according to claim 6 which further includes a discriminator circuit connected to said output signal from said rectifier circuit for determining the peak value of said rate of change of said spacing of said images.

8. Apparatus according to claim 7 wherein said discriminator circuit determines peak value for a plurality of zones along said scan path across the width of said glass.

9. Apparatus according to claim 6 which further includes an integrator circuit connected to said output signal from said rectifier circuit for determining the sum value of said rate of change of said spacing of said images.

10. Apparatus according to claim 9 wherein said integrator circuit determines sum values for a plurality of zones along said scan path across the width of said glass.

11. Apparatus according to claim 6 which further includes a a discriminator circuit and an integrator circuit, each connected to said output signal from said rectifier circuit for determining, respectively, the peak values and the sum values of said rate of change of said spacing of said images for a plurality of zones along said scan path across the width of said glass.

12. Apparatus according to claim 11 which further includes a computer connected to an output signal from said discriminator curcuit and an output signal from said integrator circuit.

13. Apparatus according to claim 12 which further includes process control equipment connected to said computer for changing process parameters in response to a signal from said computer.

14. Apparatus according to claim 12 which further includes glass marking equipment connected to said computer for marking distortion defects in said glass in response to a signal from said computer.

15. Apparatus according to claim 12 which further includes glass cutting equipment connected to said computer for cutting said glass in response to a signal from said computer.

16. A method of measuring refractive power of glass, comprising the steps of:
transmitting a beam of light of finite width at an oblique angle onto a first surface of two opposite surfaces of the glass, the beam of light being refracted through the glass to a second surface to reflect a reflected image from the first surface and a refracted image from the second surface;
imparting relative motion between the glass and the beam of light in a direction crosswise of the width of the glass; and
contemporaneously measuring the rate of change of the widthwise, center to center spacing of the reflected image the refracted image reflected from the glass.

17. A method according to claim 16 which further includes the step of:
transmitting a signal proportionate to the measured values of said rate of change of said spacing of said images to a computer.

18. A method according to claim 17 which further includes the step of:
transmitting a signal from said computer to process control equipment for changing process parameters in response to said rate of change of said spacing of said images.

19. A method according to claim 17 which further includes the step of:
transmitting a signal from said computer to glass marking equipment for marking distortion defects in said glass in response to said rate of change of said spacing of said images.

20. A method according to claim 17 which further includes the step of:
transmitting a signal from said computer to glass cutting equipment for cutting said glass in response to said rate of change of said spacing of said images.

* * * * *

UNITED STATES PATENT OFFICE
CERTIFICATE OF CORRECTION

Patent No. 3,799,679      Dated  March 26, 1974

Inventor(s)  Gabriel Simko

It is certified that error appears in the above-identified patent and that said Letters Patent are hereby corrected as shown below:

Column 5, line 22, Claim 8, "value" should be ---values---.

Column 5, line 43, Claim 12, "curcuit" should be ---circuit---.

Column 6, line 23, Claim 16, insert ---and--- between "image" and "the".

Signed and sealed this 24th day of September 1974.

(SEAL)
Attest:

McCOY M. GIBSON JR.
Attesting Officer

C. MARSHALL DANN
Commissioner of Patents